(12) United States Patent
Buchet

(10) Patent No.: US 11,661,167 B2
(45) Date of Patent: May 30, 2023

(54) DOOR MECHANISM

(71) Applicant: Rohr, Inc., Chula Vista, CA (US)

(72) Inventor: Damien Buchet, Toulouse (FR)

(73) Assignee: Rohr, Inc., Chula Vista, CA (US)

( * ) Notice: Subject to any disclaimer, the term of this patent is extended or adjusted under 35 U.S.C. 154(b) by 462 days.

(21) Appl. No.: 16/714,324

(22) Filed: Dec. 13, 2019

(65) Prior Publication Data

US 2021/0070416 A1    Mar. 11, 2021

(30) Foreign Application Priority Data

Sep. 11, 2019 (EP) ...................... 19290086

(51) Int. Cl.
*B64C 1/14* (2006.01)
*E05C 9/08* (2006.01)

(52) U.S. Cl.
CPC ................ *B64C 1/143* (2013.01); *E05C 9/08* (2013.01); *E05Y 2900/502* (2013.01)

(58) Field of Classification Search
CPC ..... B64C 1/143; B64C 1/1438; B64C 1/1423; E05C 9/08; E05Y 2900/502; E05D 2015/485; E05D 3/022; E05D 15/1002; E05D 15/1007; E05D 15/101
See application file for complete search history.

(56) References Cited

U.S. PATENT DOCUMENTS

| | | | | |
|---|---|---|---|---|
| 2,751,636 A * | 6/1956 | Varnell | ................. | B64C 1/1407 16/370 |
| 3,791,073 A * | 2/1974 | Baker | ................... | B64C 1/1407 49/40 |
| 4,552,326 A | 11/1985 | Bokalot | | |
| 4,720,065 A * | 1/1988 | Hamatani | ................ | B64C 1/143 244/905 |
| 4,854,010 A * | 8/1989 | Maraghe | ................ | B64C 1/1407 49/248 |
| 5,031,863 A | 7/1991 | Noble | | |
| 5,289,615 A * | 3/1994 | Banks | ...................... | B64C 1/143 244/905 |
| 5,379,971 A * | 1/1995 | Kim | ....................... | B64C 1/1407 244/129.5 |
| 6,116,542 A | 9/2000 | Erben | | |

(Continued)

FOREIGN PATENT DOCUMENTS

EP          0317037          5/1989

OTHER PUBLICATIONS

European Patent Office, European Search Report dated Mar. 27, 2020 in Application No. 19290086.8.

*Primary Examiner* — Christopher D Hutchens
(74) *Attorney, Agent, or Firm* — Snell & Wilmer L.L.P.

(57) ABSTRACT

A door assembly (2) for an aircraft is moveable between a closed position and a disengaged position and comprises a door frame (6), a hinge arm (12) pivotally coupled to the door frame (6), and a door (4). A support bracket (14) pivotally supports the door (4) on the hinge arm (12). The door frame (6) and door (4) each comprise at least one stop (8, 10) configured to engage with each other to retain the door (4) within the door frame (6) in the closed position. At least one pin (18, 20; 38) is mounted on each side of the door (4) and at least first and second guides (28, 30; 40) are coupled to the sides of the door frame (6). Each guide (28, 30; 40) comprises a channel (24, 26; 43) receiving a pin (18, 20; 38).

15 Claims, 21 Drawing Sheets

(56) References Cited

U.S. PATENT DOCUMENTS

| | | | |
|---|---|---|---|
| 10,240,383 B2 | 3/2019 | Bessettes et al. | |
| 2002/0096602 A1 | 7/2002 | Dazet et al. | |
| 2006/0202087 A1 | 9/2006 | Mortland | |
| 2007/0045472 A1* | 3/2007 | Erben | B64C 1/1423 244/129.5 |
| 2009/0108133 A1 | 4/2009 | Clausen | |
| 2010/0024305 A1* | 2/2010 | Kim | E05D 3/12 244/129.5 |
| 2010/0059628 A1 | 3/2010 | Kobayashi et al. | |
| 2013/0318873 A1 | 12/2013 | Knijnenburg | |
| 2015/0292254 A1 | 10/2015 | Bessettes et al. | |
| 2017/0158305 A1* | 6/2017 | Werthmann | E05D 15/54 |
| 2018/0273156 A1* | 9/2018 | Vergnot | B64C 1/143 |
| 2020/0071978 A1* | 3/2020 | Holtrup | E05B 85/04 |
| 2021/0387713 A1* | 12/2021 | Dubosc | B64C 1/1438 |

* cited by examiner

DOOR MECHANISM

CROSS-REFERENCE TO RELATED APPLICATIONS

This application claims priority to European Patent Application 19290086.8 filed Sep. 11, 2019 entitled "DOOR MECHANISM." The contents of the foregoing application is hereby incorporated by reference for all purposes.

TECHNICAL FIELD

The present disclosure relates to mechanisms for operating doors, and in particular but not exclusively to mechanisms for operating doors of pressurised chambers, such as aircraft cabins.

BACKGROUND

Aircraft doors, such as passenger doors, are generally opened by an initial vertical lift motion before being translated horizontally to a forward position along a circular trajectory. Current lift motion solutions present major drawbacks with regard to the kinematics sequence. For example, the lift motion usually requires the management of a large gap between the door and the fuselage skin involving the use of an aerodynamic seal. Aerodynamic seals can be undesirable due to their cost and weight, as well as potentially causing problems such as noisy fluttering due to damage. Furthermore, the lift motion usually requires the incorporation of weight compensation devices for the manual operation of the door. Such devices may induce undesirable loads and friction into the door mechanism.

SUMMARY

In a first aspect of the present disclosure, a door assembly for an aircraft is moveable between a closed position and a disengaged position and comprises a door frame, a hinge arm pivotally coupled at one end to a first side of the door frame, and a door receivable within the door frame. A support bracket is pivotally coupled at one end to the other end of the hinge arm and at its other end to the door to support the door on the hinge arm. The door frame and door each comprise at least one stop and the stops are configured to engage with each other to retain the door within the door frame in the closed position of the door assembly. At least one pin is mounted on each side of the door, at least a first guide is coupled to the first side of the door frame and at least a second guide is coupled to a second opposed side of the door frame. Each guide comprises a channel receiving a respective one of the pins to guide horizontal movement of the door relative to the door frame. A link arm is pivotally coupled at one end to the support bracket and the hinge arm such that the link arm maintains the same orientation with respect to the door frame at all positions of the door between the closed and disengaged positions. An actuation mechanism is coupled to the door and to the link arm for displacing the door along a horizontal trajectory defined by the guides and pins to disengage the stops and release the door from the door frame to allow the door assembly to be moved from the closed position to the disengaged position.

The link arm, support bracket and hinge arm may be pivotally coupled about a common axis such that the link arm, support bracket and hinge arm are all rotatable with respect to each other about the common axis.

The link arm may comprise trunnions on opposed sides of the link arm along the axis about which the hinge arm and support bracket are pivoted.

The actuation mechanism may comprise a rotary control lever and a rod, the control lever comprising a control lever shaft pivotally mounted to the door about a second axis and to the link arm, the rod being pivotally coupled at one end to the control lever and at the other end to the link arm at a position intermediate the ends of the link arm, whereby rotation of the control lever about the second axis effects displacement of the door along the horizontal trajectory.

The control lever may have a crank arm for rotating the control lever about the second axis and for connection to an operating handle.

The control lever shaft may have a first portion for pivotal mounting to the door and a second portion received in a slot provided on the link arm, the second portion being offset from the second axis.

The slot may be curved to assist in displacing the door along the horizontal trajectory.

At least a portion of the channel of the first guide may be generally C-shaped such that, as the door is displaced along the horizontal trajectory from the closed position, in a first phase of movement the pin received in the channel of the first guide moves along the channel inwardly away from the door frame and towards the second guide, in a second phase of movement the pin moves outwardly towards the door frame, and in a third phase of movement the pin moves outwardly towards the door frame and away from the second guide.

At least a portion of the channel of the second guide may be linear such that the pin received in the channel of the second guide moves away from the first guide in the first phase of movement and towards the first guide in the third phase of movement.

The pin received in the channel of the second guide may be eccentrically mounted to the door such that initial rotation of the control lever from the closed position causes movement of the door inwardly away from the second side of the door frame.

The channel of the second guide may comprise a kink such that the pin received in the channel of the second guide moves inwardly in the first phase of movement to move the door inwardly away from the second side of the door frame.

The channel of each guide may comprise an opening to enable disengagement of the pin from the guide to allow the door to open once the door assembly is in the disengaged position.

At least one of the pins may be a roller with a vertical axis of rotation.

In another aspect of the present disclosure, an aircraft comprises the door assembly of any of the above.

In yet another aspect of the present disclosure, a method of opening a door received within a door frame, the door coupled to the door frame by a hinge arm, comprises guiding the door along a horizontal trajectory by moving at least two pins mounted on the door along respective guides coupled to the door frame to disengage the door from the door frame, and swinging the door open on the hinge arm.

BRIEF DESCRIPTION OF THE DRAWINGS

Embodiments of a door assembly in accordance with the disclosure will now be described by way of example only with reference to the accompanying drawings in which.

DETAILED DESCRIPTION

Figure 1:
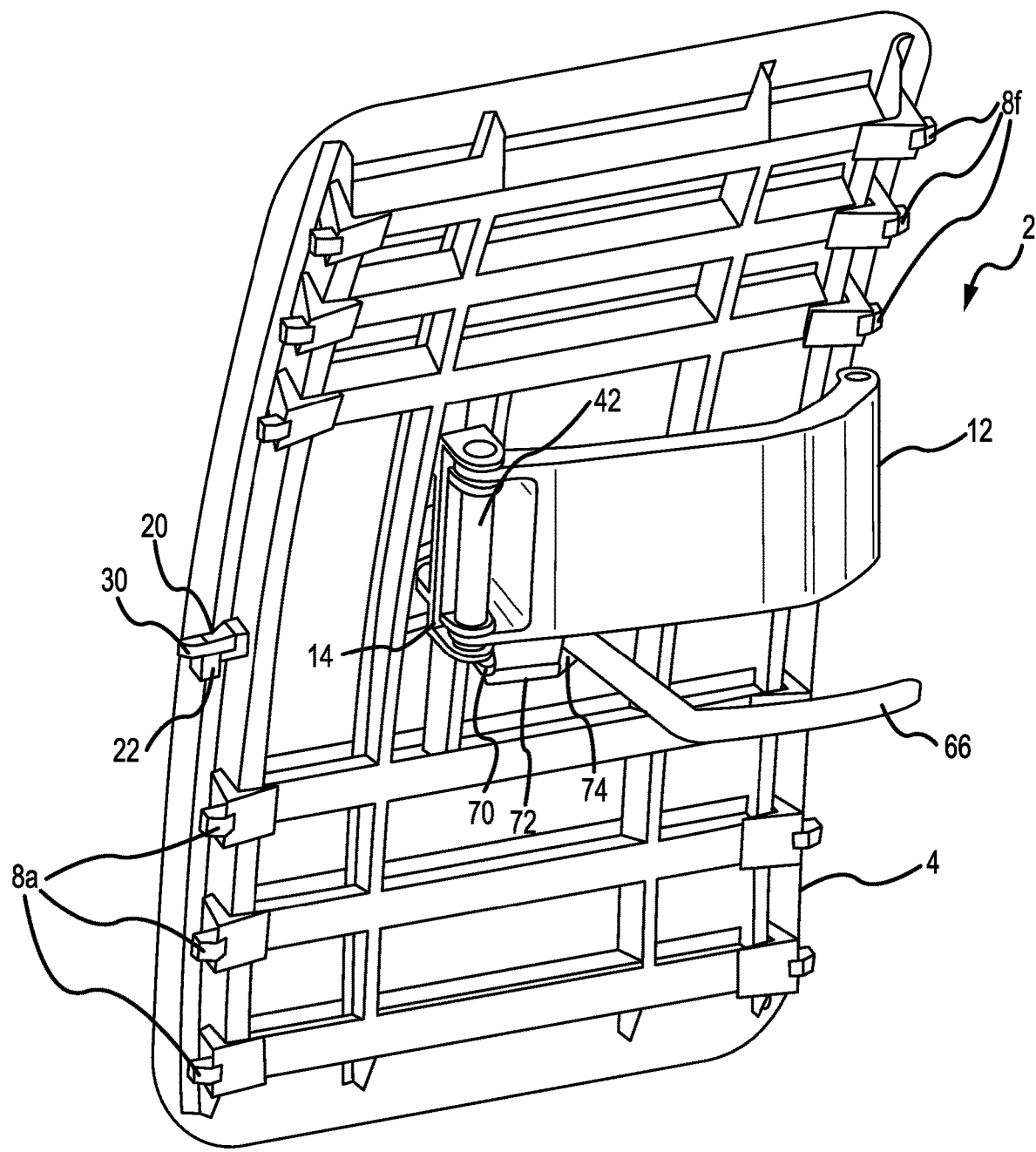
FIG. 1 is a perspective view of a door of the door assembly.
Figure 2:
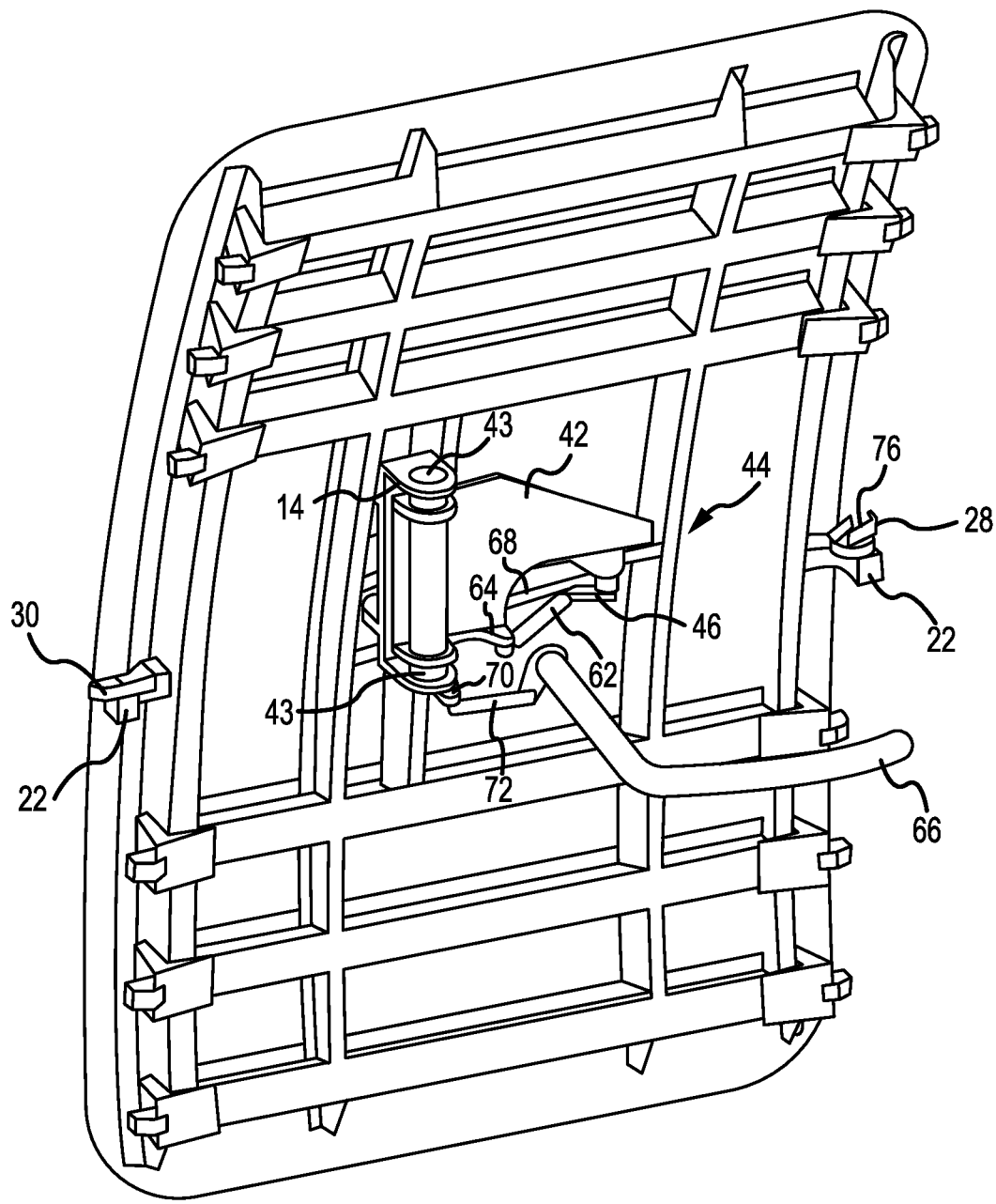
FIG. 2 shows the door of FIG. 1 without the hinge arm so the actuation mechanism is visible.
Figure 3:
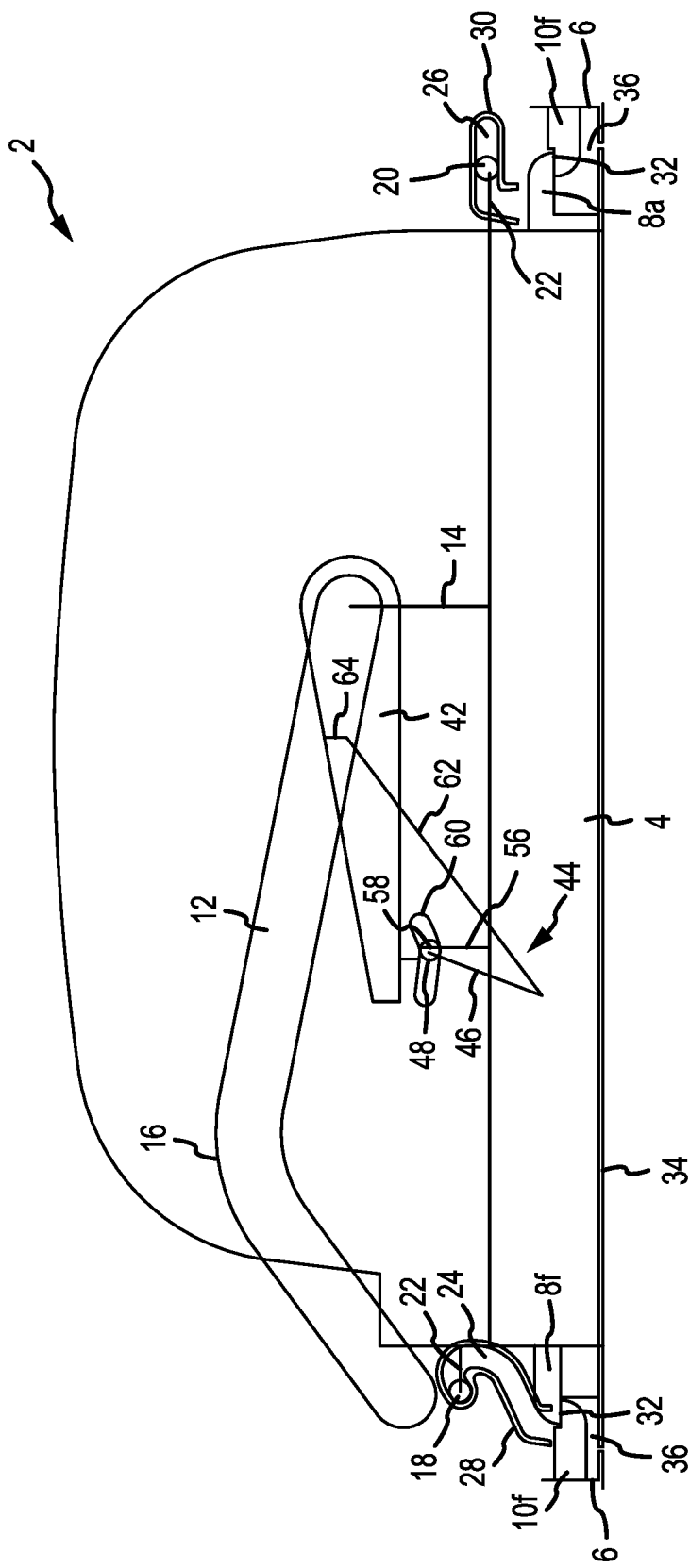
FIG. 3 is a schematic 2D cross-section of the door assembly in the closed position.

With reference to FIGS. 1 to 3, a door assembly 2 in accordance with the disclosure comprises a door 4 mounted in a door frame 6 and an actuation mechanism 44 which enables the door 4 to be disengaged from the door frame 6, opened and closed without undergoing any vertical movement. In embodiments, the door 4 is used to enclose a pressurised compartment of an aircraft, such as a passenger door, a service door, a cargo door or an emergency exit door.

The door assembly 2 is moveable along a horizontal trajectory between a closed position (FIG. 3), a disengaged position (FIG. 10) and an open position. In the illustrated embodiment, in the closed position the door 4 is received within the door frame 6 and door stops 8 are engaged with frame stops 10 to prevent the opening of the door 4, as can be seen in FIG. 3. In the disengaged position shown in FIG. 10, the door stops 8 have been disengaged from the frame stops 10 and the door 4 has been disengaged from the door frame 6 ready to be swung open into the open position to allow passage through the doorway. FIGS. 3 to 10 give a step-by-step demonstration of the horizontal trajectory of the door 4 and the operation of the actuation mechanism 44 as the door 4 disengages from the frame 6.

As illustrated in FIGS. 3 to 10 and 12 to 21, the door 4 is coupled to the door frame 6 by a hinge arm 12 and at least two roller and guide pairs. The hinge arm 12 is pivotally coupled at one end to the door frame 6 and at the other end to the door 4 through a support bracket 14. One side of the support bracket 14 is pivotally coupled to the hinge arm 12 about a pivot axis A and the other side of the bracket is pivotally coupled to the door 4 about a pivot axis B. The support bracket 14 supports the weight of the door 4 as it swings open about the pivotal coupling between the hinge arm 12 and the frame 6. The hinge arm 12 provides the swinging action for the door 4 to be opened and, as shown, may have a bend 16 between its ends.

In the illustrated embodiment, the door assembly 2 provides a passenger door in the side of an aircraft fuselage. As such, the side of the door frame 6 supporting the hinge arm 12 is closer to the front of the aircraft and so this side of the door assembly 2 will be referred to as the "forward" side and the other side of the door assembly 2 will be referred to as the "aft" side. Furthermore, directions generally parallel to the plane of the door 4 will be referred to as "vertical" and directions generally perpendicular to the plane of the door 4 will be referred to as "horizontal". It will be understood that the present invention is not intended to be limited to these directions or orientations, and the directions may, at least, be reversed. Also in the illustrated embodiment, the hinge arm 12 and actuation mechanism 44 are on the interior face of the door 4 and the door 4 opens inwards. However, in other embodiments, the hinge arm 12 and actuation mechanism 44 may be arranged on the exterior face 34 of the door 4 and/or the door 4 may open outwards. The terms "interior", "exterior", "inwards" and "outwards" are therefore used in the description and claims as relative terms and are not necessarily intended to refer to being inside or outside.

Each side of the door 4 has a pin in the form of a roller 18, 20 protruding vertically from a roller support 22 projecting horizontally from the door 4. Each roller 18, 20 is received by a channel 24, 26 in a guide 28, 30 that is fixed to the door frame 6 so that horizontal movement of the door 4 can slide the rollers 18, 20 along their corresponding channels 24, 26. Horizontal movement of the door 4 is therefore dictated by the shape of the channels 24, 26 in the guides 28, 30.

In the illustrated embodiment, the door assembly 2 has one roller 18, 20 and corresponding guide 28, 30 on each side, however in other embodiments there may be a plurality of rollers 18, 20 and guides 28, 30 on each side, for example two or three rollers 18, 20 and guides 28, 30 on each side. The rollers 18, 20 provide the advantage of reducing friction as the door 4 is moved to provide an easier and smoother disengagement. However, in other embodiments, any of the rollers 18, 20 may be replaced by pins which do not rotate. The shapes of the guide channels 24, 26 can be tailored to define a specific displacement of the door 4 to disengage it from the door frame 6, which will now be described with reference to the illustrated embodiment.

When the door 4 is closed, stops 8 on the door 4 are engaged with corresponding stops 10 on the door frame 6, as shown in FIG. 3. The stops 8, 10 engage with each other to prevent the door 4 opening under force applied from the interior side (e.g. by air in the pressurised compartment) when the door 4 is closed. The door assembly 2 has at least one stop 8, 10 on each of the door 4 and door frame 6, but preferably has at least six stops 8 on each edge of the door 4 to engage with a corresponding number of stops 10 on each side of the door frame 6.

In the illustrated embodiment, each frame stop 10 has a recess 32 at the distal end thereof which receives a distal end of the corresponding door stop 8. Each recess 32 prevents horizontal movement of the door 4 in the aft or forward directions when the door 4 is closed. As can be seen in FIGS. 3 to 10, the exterior surface 34 of the door 4 extends up to or beyond the distal ends of the door stops 8. Therefore, when the door 4 is closed and the stops 8, 10 are engaged, as in FIG. 3, at least part of each frame stop 10 is received between the door stops 8 and the edges of the exterior door surface 34 to prevent both inward and outward movement of the door 4.

As can be seen in FIG. 3, a certain clearance 36 is maintained between the inside of the exterior door surface 4 and each frame stop 10 when the door 4 is in the closed position. The depth of this clearance is at least equal to the depth of the recesses 32 in the frame stops 10. This arrangement allows the stops 8, 10 to be disengaged by an initial inward movement of the door 4, demonstrated in FIGS. 4 and 5, so that the door stops 8a on the aft side are free of the recesses 32 in the frame stops 10a and the door 4 can move aft.

Figure 5:
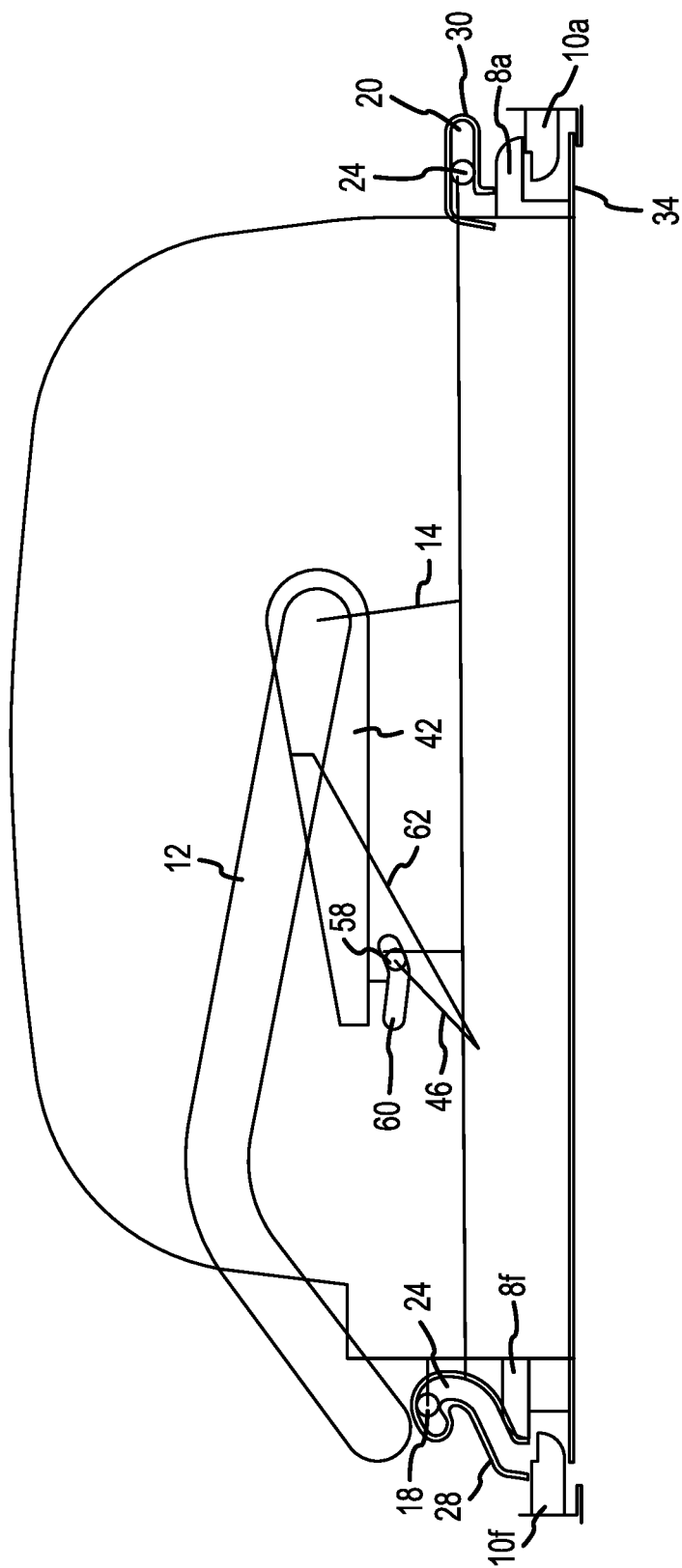
Figure 6:
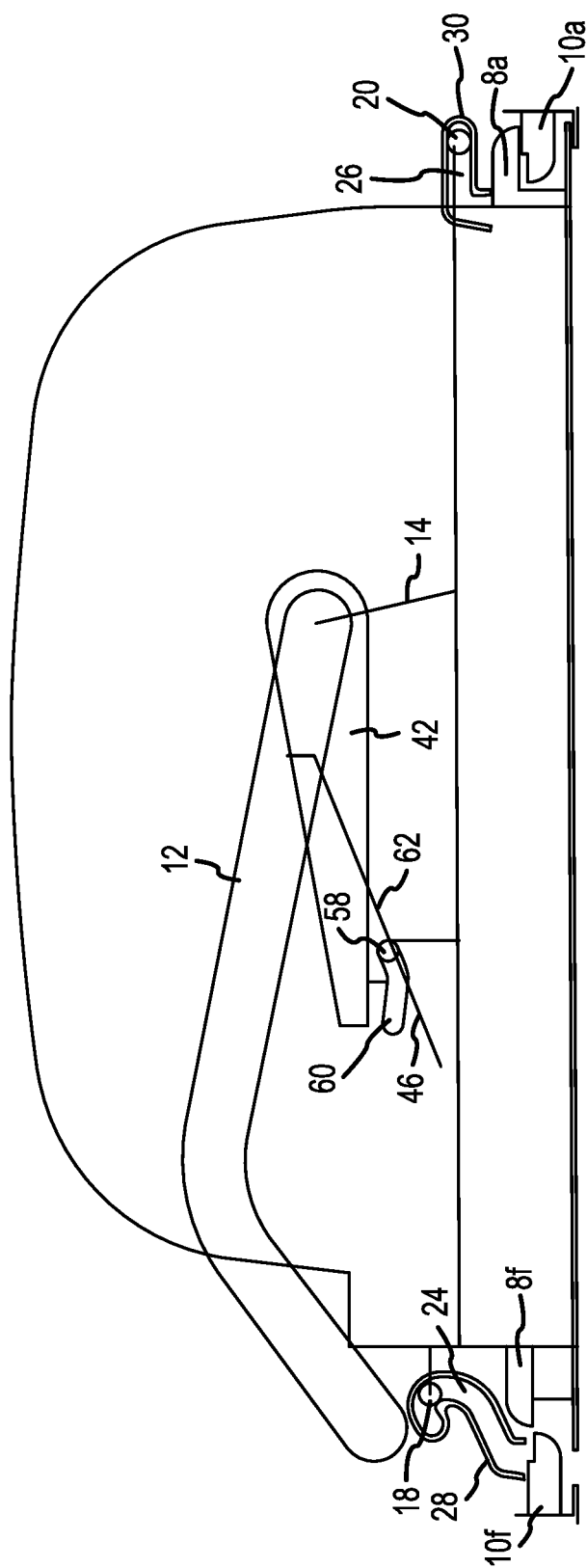
Figure 7:
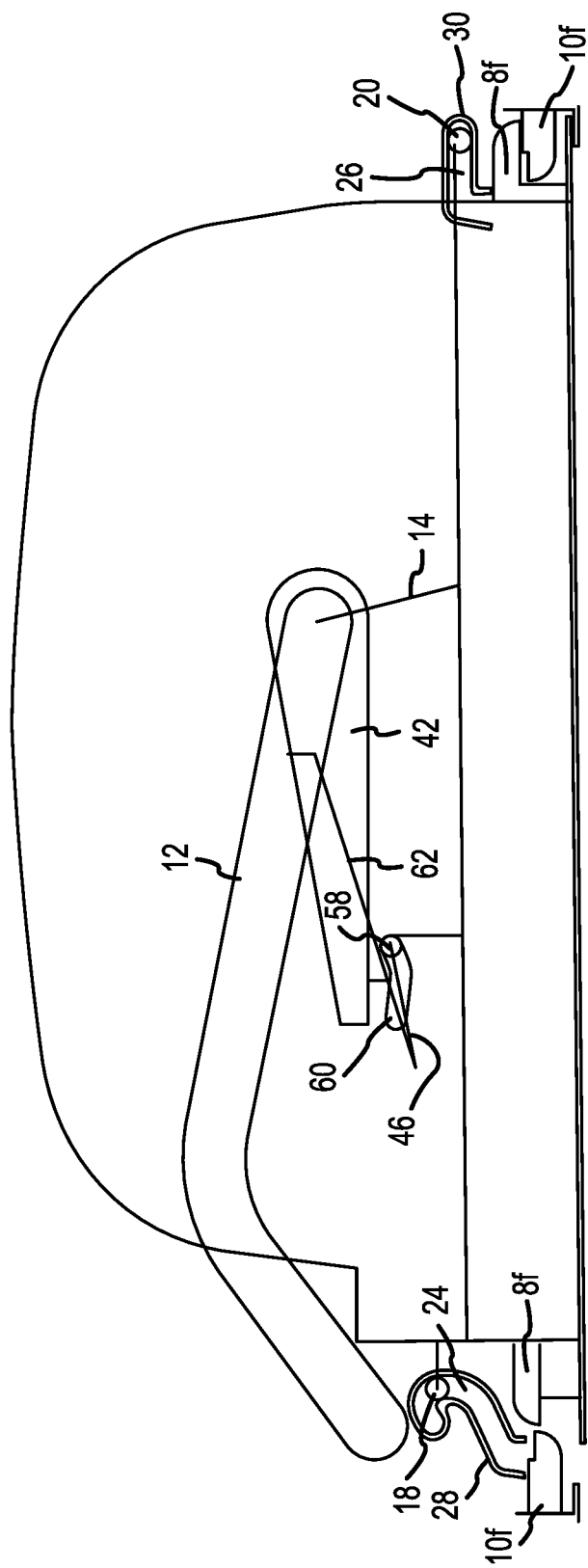
Figure 8:
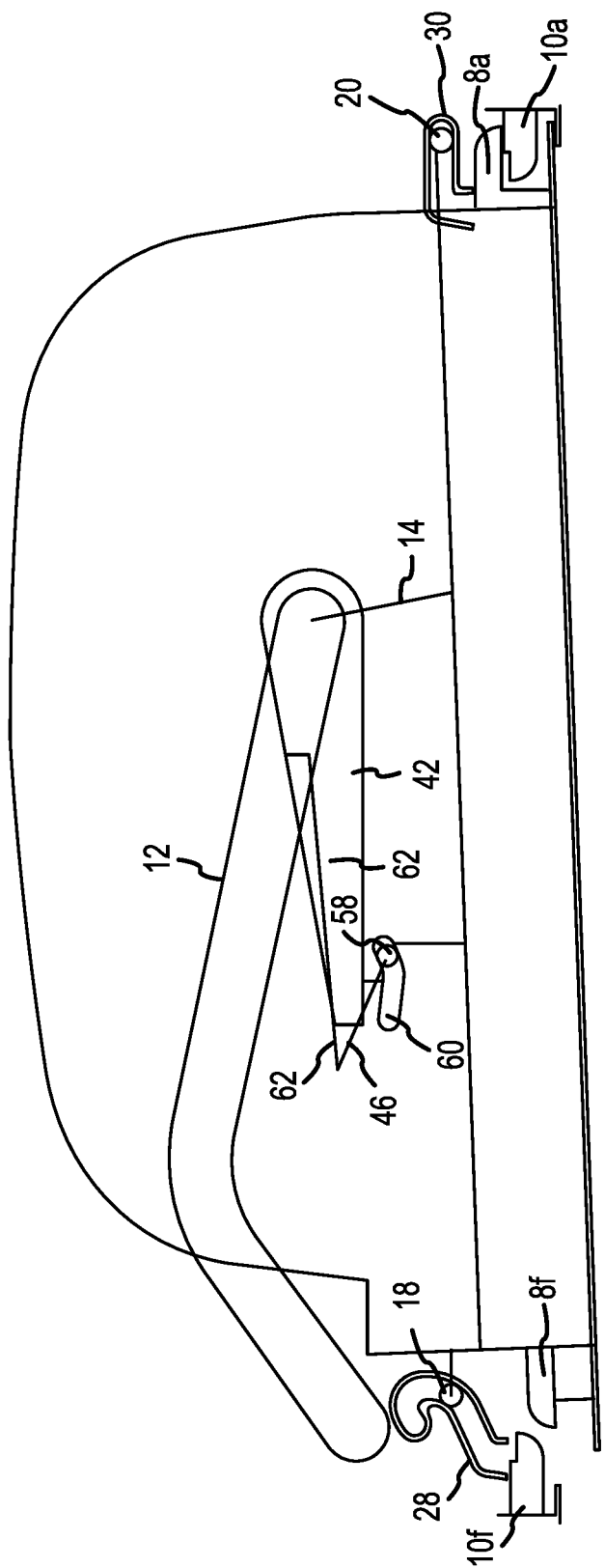
Figure 9:
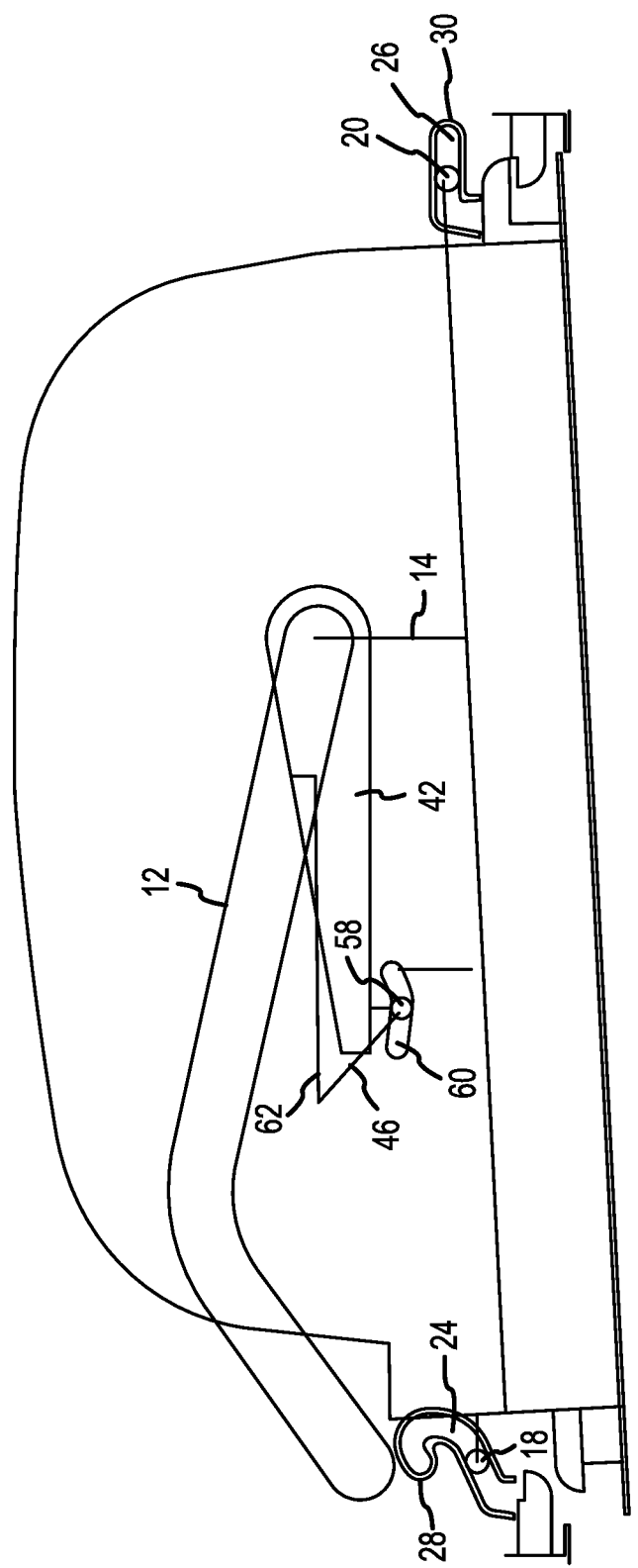

As the door 4 moves aft, shown in FIGS. 5 to 7, the forward door stops 8f are moved away from the forward frame stops 10f so that the forward frame stops 10f no longer prevent outward movement of the forward door stops 8f or the door 4, as can be seen in FIG. 6. The forward side of the door 4 is then able to move outward from the door frame 6, and then the whole door 4 can move outwards and forwards, shown in FIGS. 8 to 10, with the forward door stops 8f circumventing the forward frame stops 10f, until the aft door stops 8a are free of the aft frame stops 10a as in FIG. 10. At this point, the door assembly 2 has reached its disengaged position and the door 4 is now free to swing open inwardly on the hinge arm 12.

Figure 4:
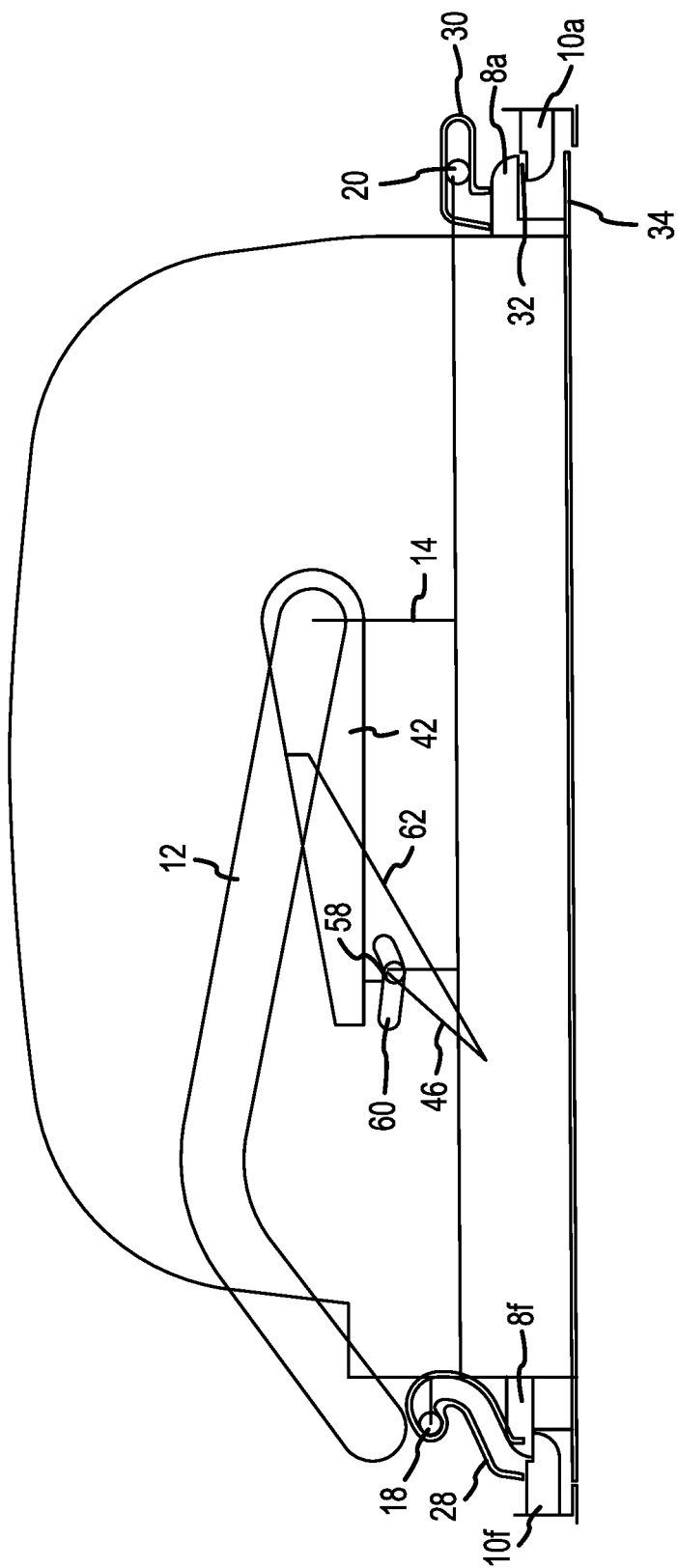
FIGS. 4 to 10 show the door assembly of FIG. 3 at various positions throughout a movement from the closed position to the disengaged position.

In the illustrated embodiment, the displacement of the door 4 relative to door frame 6 is defined by a generally C-shaped channel 24 in the forward guide 28 and a generally linear channel 26 in the aft guide 30. As can be understood from the shapes of the channels 24, 26, the aft roller 20 is only permitted to move in the aft or forward directions as the door assembly 2 moves between the closed and disengaged positions, whereas the forward roller 18 has an initial, relatively small inward displacement (see FIGS. 3 and 4) followed by a larger outward displacement in addition to the aft and forward displacements (FIGS. 5 to 10). The initial inward movement of the aft side of the door 4 is provided by the aft roller 20 being eccentrically mounted to the roller support 22. This initial inward movement shown in FIG. 4 provides an ice breaking action in the event of a build-up of ice hindering the opening of the door 4. FIG. 11 shows an embodiment in which the eccentric roller and linear aft guide have been replaced by a standard roller 38 and an aft guide 40 with a channel 43 that is kinked, or stepped, inward. The kink 41 provides the initial inward ice breaking motion that is provided in other embodiments by the eccentric roller 20.

It will be understood that the shapes of the channels 24, 26 can be designed to suit any desired displacements for the door 4 out of engagement with the door frame 6 and other embodiments may include differently shaped channels 24, 26. The skilled person would be able to contemplate a variety of different channel 24, 26 shape combinations and so the present invention is not intended to be limited to the specific configuration depicted in the figures.

As demonstrated in FIGS. 3 to 10 and as also shown step-by-step in FIGS. 12 to 17, the door 4 is moved along the horizontal trajectory between the closed position (FIGS. 3 and 12) and the disengaged position (FIGS. 10 and 17) defined by the guides 28, 30 by a link arm 42 and actuation mechanism 44. Further details of the link arm 42 and actuation mechanism 44 are shown in FIGS. 18 to 21.

In this embodiment, the support bracket 14 is pivotally mounted to one end of the link arm 42 about the same pivot axis A as the hinge arm 12. As shown in FIG. 2, the link arm 42 has a trunnion 43 on each axial end with respect to the axis A. The support bracket 14 and hinge arm 12 are pivotally received on the trunnions 43. The link arm 42, support bracket 14 and hinge arm 12 are therefore all pivotable relative to each other about the same axis A, and pivotable relative to the door 4 about the support bracket pivotal axis B. In other embodiments, the link arm 42 and hinge arm 12 may be mounted to the support bracket 14 at different locations on the support bracket 14. In other embodiments, the support bracket 14 may be mounted to one of the link arm 42 and hinge arm 12 and indirectly coupled to the other of the link arm 42 or hinge arm 12. However, mounting the support bracket 14, hinge arm 12 and link arm 42 about a common axis provides a better load path to support the door 4 on the hinge arm 12.

Figure 18:
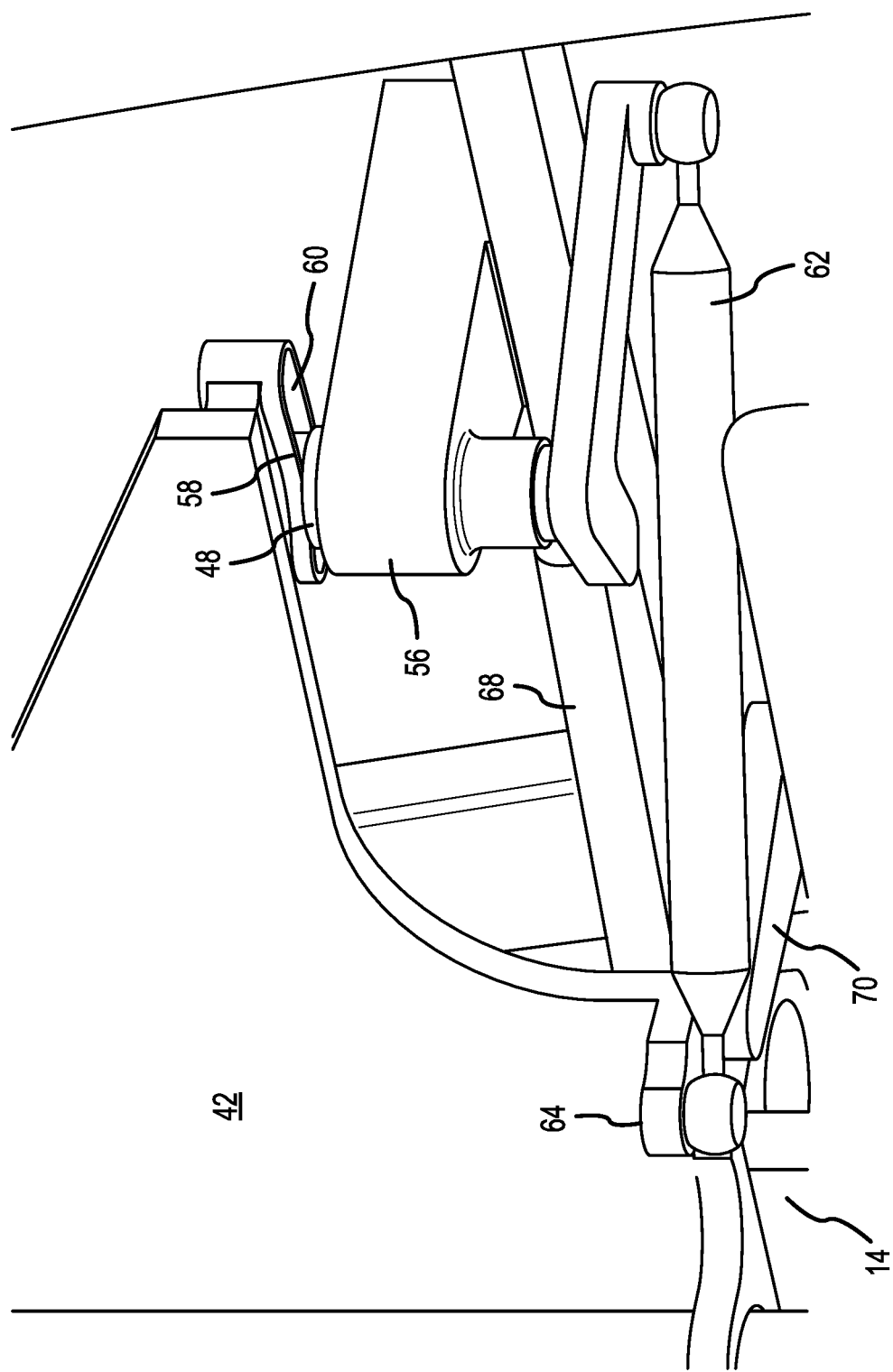
FIG. 18 is a close-up perspective view of part of the door assembly.
Figure 19:
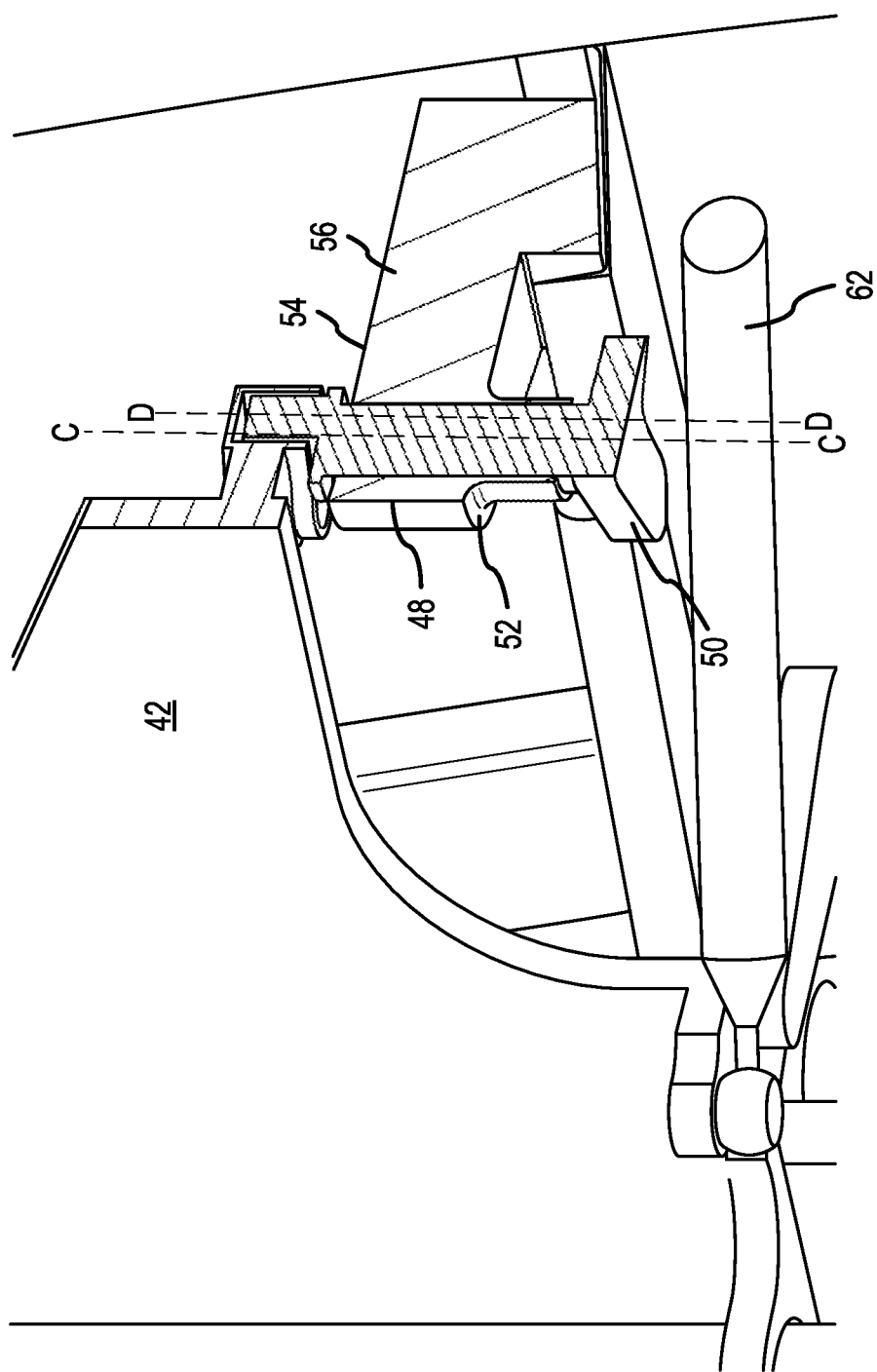
FIG. 19 is a cross-sectional view of FIG. 18.

The actuation mechanism 44 is coupled to the link arm 42 and the door 4 and comprises at least two members. In this embodiment, the first member is a control lever 46 comprising a vertically extending shaft 48 at one end and a crank arm 50. With reference to FIGS. 18 and 19, a first portion 52 of the shaft 48 extends through a bore 54 of a mounting boss 56 protruding horizontally from and fixed to the door 4 such that the control lever 46 is coupled to the door 4 and pivotable about an axis C extending through the bore 54. A second portion 58 of the shaft 48 is received within a slot 60 mounted at the end of the link arm 42 opposite the pivot axis A. The second portion 58 of the shaft 48 has a vertical axis D that is parallel to but offset from the axis C. Thus, rotation of the control lever 46 about the axis C causes eccentric rotation of the shaft 48 within the slot 60 of the link arm 42.

Referring back to FIGS. 12 to 17, the control lever 46 is also coupled to the second member of the actuation mechanism 44 which, in this embodiment, is a rod 62. The rod 62 is pivotally coupled at one end to the control lever 46 and at the other end to the link arm 42 at a position between the ends of the link arm 42. As illustrated, the link arm 42 may provide a tab 64 for the pivotal coupling to the rod 62.

The link arm 42 and actuation mechanism 44 are arranged so that rotation of the control lever 46 about the axis C, for example by a force applied to its crank arm 50, pushes or pulls on the rod 62 depending on the relative rotational positions of the rod 62 and control lever 46. The rotating members of the actuation mechanism 44 apply forces to the link arm 42 and the door 4 to move the door 4 along its defined trajectory by moving the control lever shaft 48 along the slot 60 in the link arm 42 and pivoting the support bracket 14 about both pivot axes A and B.

Since the link arm 42 is pivotally coupled at one end to the door 4 via the support bracket 14, the link arm 42 may maintain a fixed orientation as the door assembly 2 moves from the closed position to the disengaged position. In an example (not shown), the hinge arm 12 and link arm 42 may be provided with a chain drive to maintain the fixed orientation of the link arm 42 in a manner known in the art. In the illustrated embodiment, the link arm 42 is substantially parallel to the plane of the door 4 when the door assembly 2 is in the closed position, and the link arm 42 maintains this orientation as the door assembly 2 moves into the disengaged position, despite a change in angle of the door 4. This fixed orientation is shown throughout the step-by-step actuation in FIGS. 3 to 10, and 12 to 17. Though the link arm 42 maintains the same orientation, it can still change position by moving inward and outwards.

Since the link arm 42 is coupled to the door 4 by the control lever 46 extending through the mounting boss 56 on the door 4 and into the slot 60, relative movement of the link arm 42 and door 4 is also guided by movement of the shaft 48 along the slot 60. This means that, as the link arm 42 is held in a fixed orientation, the force imparted by the rod 62 on the link arm 42 causes the door 4 to pivot with respect to the link arm 42 about the pivot axis B, and the shaft 48 on the control lever 46 to travel along the slot 60.

The slot 60 is shaped to complement the shapes of the channels 24, 26 of the guides 28, 30 on the sides of the door frame 6 such that the door 4 performs the desired pivoting to disengage from the door frame 6 as described above with reference to FIGS. 3 to 10. In the illustrated embodiment, the slot 60 extends between the forward and aft directions with a curve between its ends to ensure that the forward roller 18 moves around the curve in the C-shaped channel 24, 26.

Figure 20:
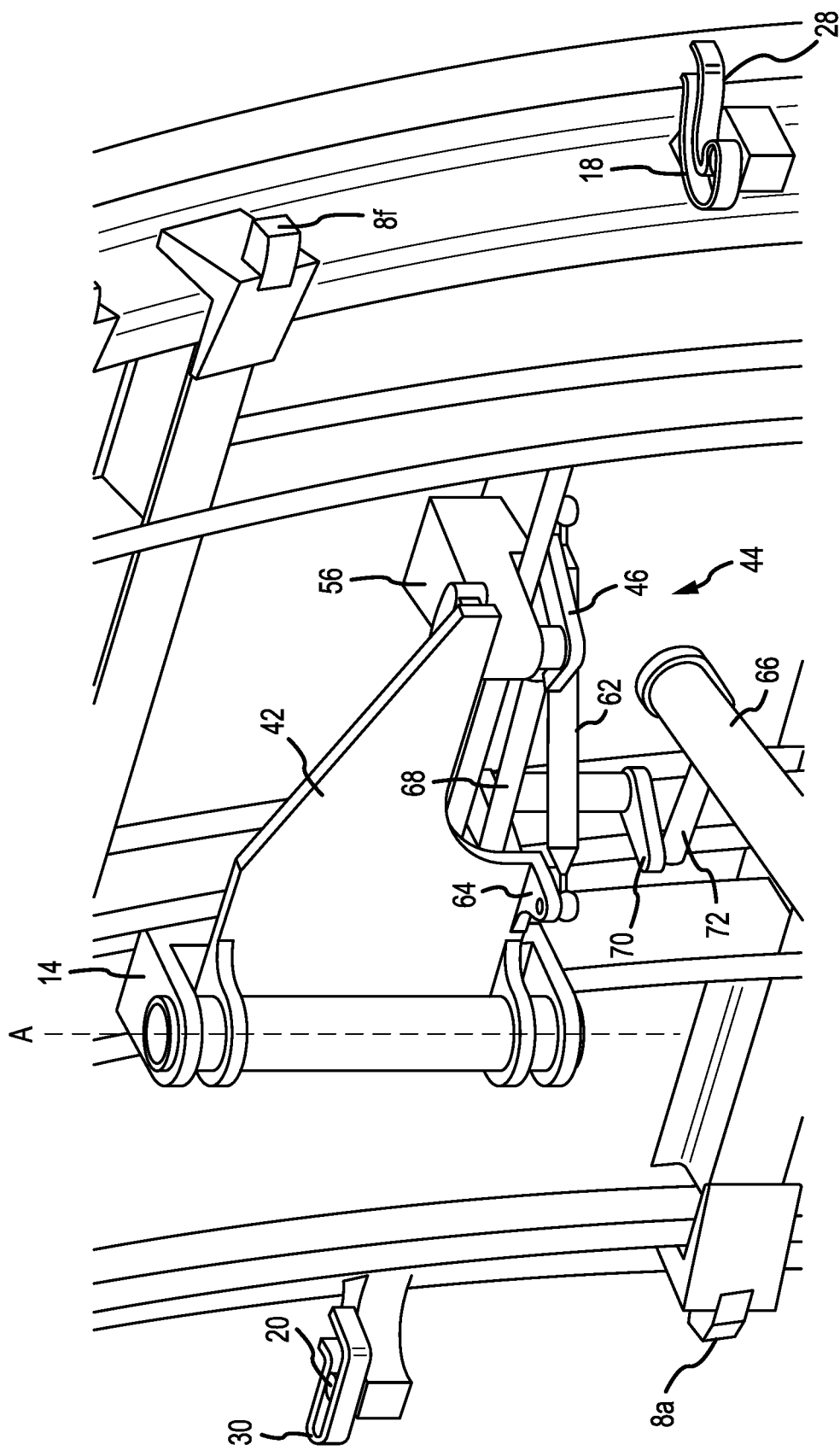
FIG. 20 is a perspective view of part of the door assembly with the actuation mechanism in the closed position.
Figure 21:
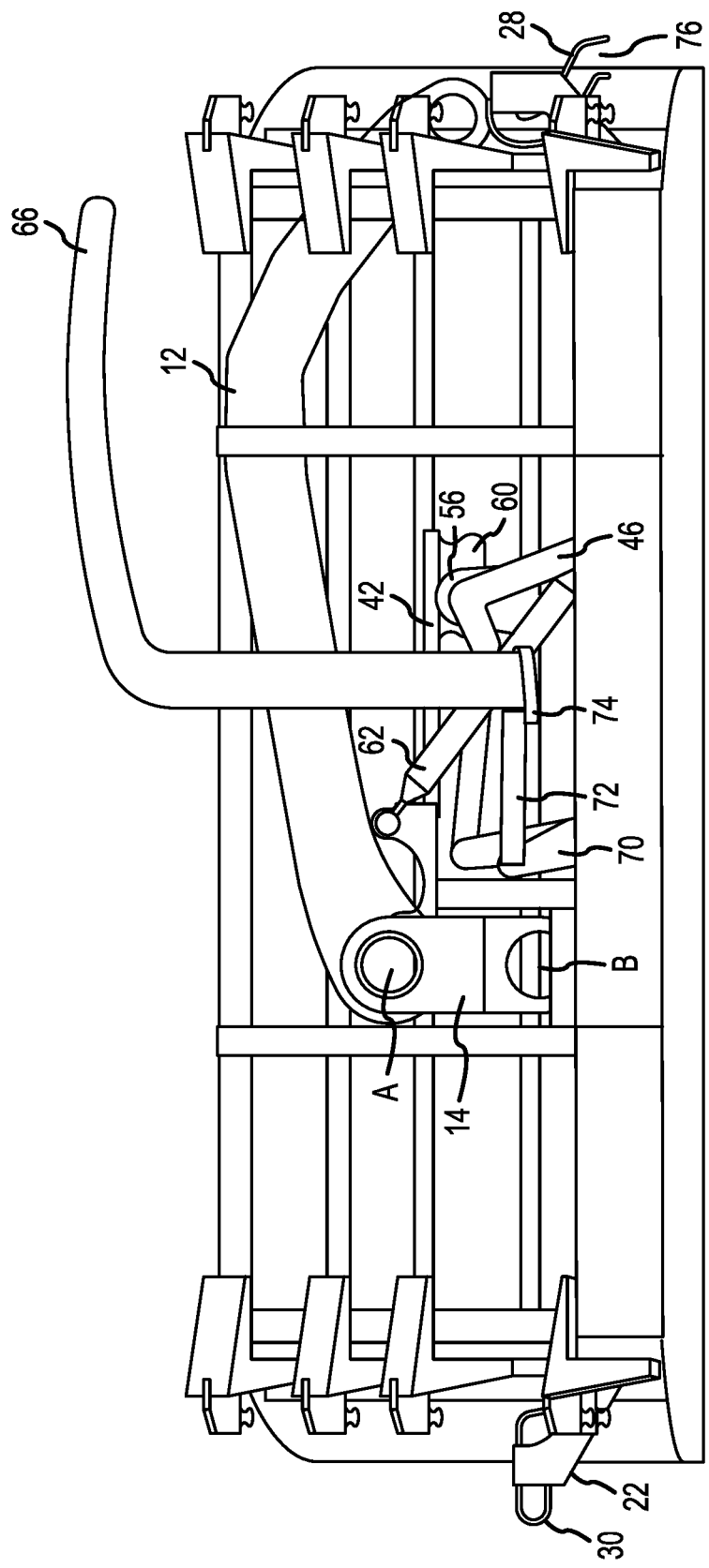
FIG. 21 is a bottom view of the door assembly with the actuation mechanism in the closed position.

In embodiments, the actuation mechanism 44 may comprise more than two members. With reference to FIGS. 20 and 21, the actuation mechanism 44 may be coupled to and controllable by a door handle 66 and comprises a further two members between the control lever 46 and the door handle 66.

The third member of the actuation mechanism 44 comprises a horizontally extending shaft 68 coupled to a rocker 70 that is pivotable about a vertical axis. The shaft 68 is coupled to the crank arm 50 of the control lever 46 such that pivoting of the rocker 70 causes rotation of the control lever 46 about axis C through the shaft 68.

The fourth member of the actuation mechanism 44 is a rod 72 which is driven by a lever or cam 74 coupled to and rotatable with the door handle 66. In this embodiment, the lever 74 is a teardrop-shaped plate. The rod 72 is coupled to the rocker 70 such that the rod 72 can be driven by the lever 74 to pivot the rocker 70 about its vertical axis. This is, of course, just an example of one suitable arrangement and the skilled person will be able to contemplate alternative arrangements for imparting a rotary movement to the control lever 46.

The operation of the actuation mechanism 44 will now be described with reference to the figures.

Starting from the configuration of the actuation mechanism 44 when the door assembly 2 is in the closed position (FIGS. 1 to 3, 12, 20 and 21), turning the door handle 66 upwards rotates the lever 74 to cause the rod 72 to move forward. The forward movement of the rod 72 pivots the rocker 70 of the third member so that the shaft 68 moves forward and operates the crank arm 50 of the control lever 46 to rotate the control lever 46 about the axis C. The rotation of the control lever 46 applies tension to the rod 62 which rotates the rod 62 in the same direction (see FIGS. 3 to 6 and 12 to 15). As can be seen in FIGS. 3 and 18, the second portion 58 of the control lever shaft 48 is initially positioned between the ends of the slot 60. The eccentricity of the control lever shaft 48 and the aft roller 20 transform the actuation of the control lever 46 into a small rotation of the door 4.

With reference to FIGS. 5 to 6 and 13 to 15, as the control lever 46 and rod 62 continue to rotate, the shaft 48 moves aft along the slot 60. At the same time, the rollers 18, 20 move along the channels 24, 26 in their guides, with the forward roller 18 moving first aft and inward and then starting to move outward and the aft roller 20 moving aft. This moves the door 4 aft and inwards and then the forward side of the door 4 starts to move outwards.

Once the shaft 48 has reached the aft end of the slot 60 (FIGS. 6 and 15), the relative rotational positions of the control lever 46 and rod 62 mean that the control lever 46 starts to apply a compressive force to the rod 62 (FIGS. 7 to 10 and 16 to 17). The forward roller 18 and forward side of the door 4 move outward and then forward as the shaft 48 moves forward along the slot 60 and the aft roller 20 moves forward along its channel 26.

Figure 10:
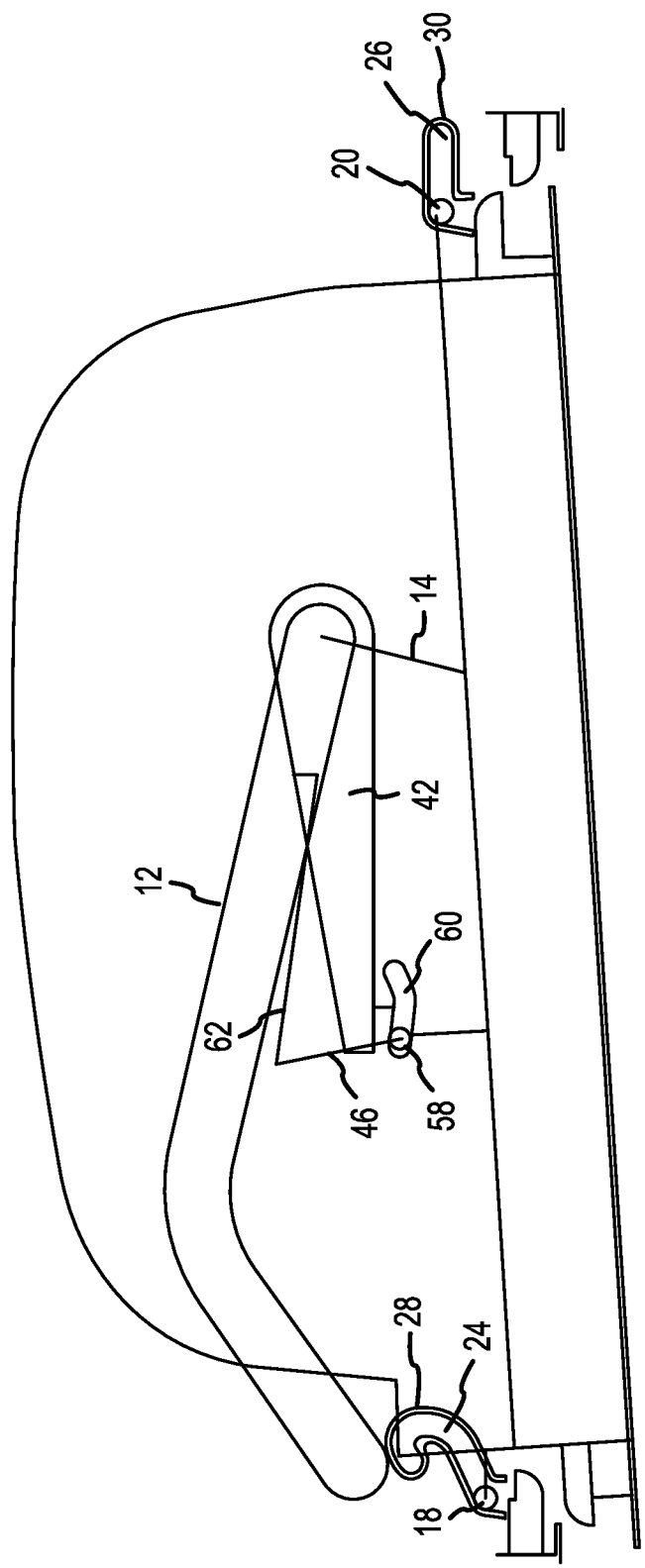
Figure 11:
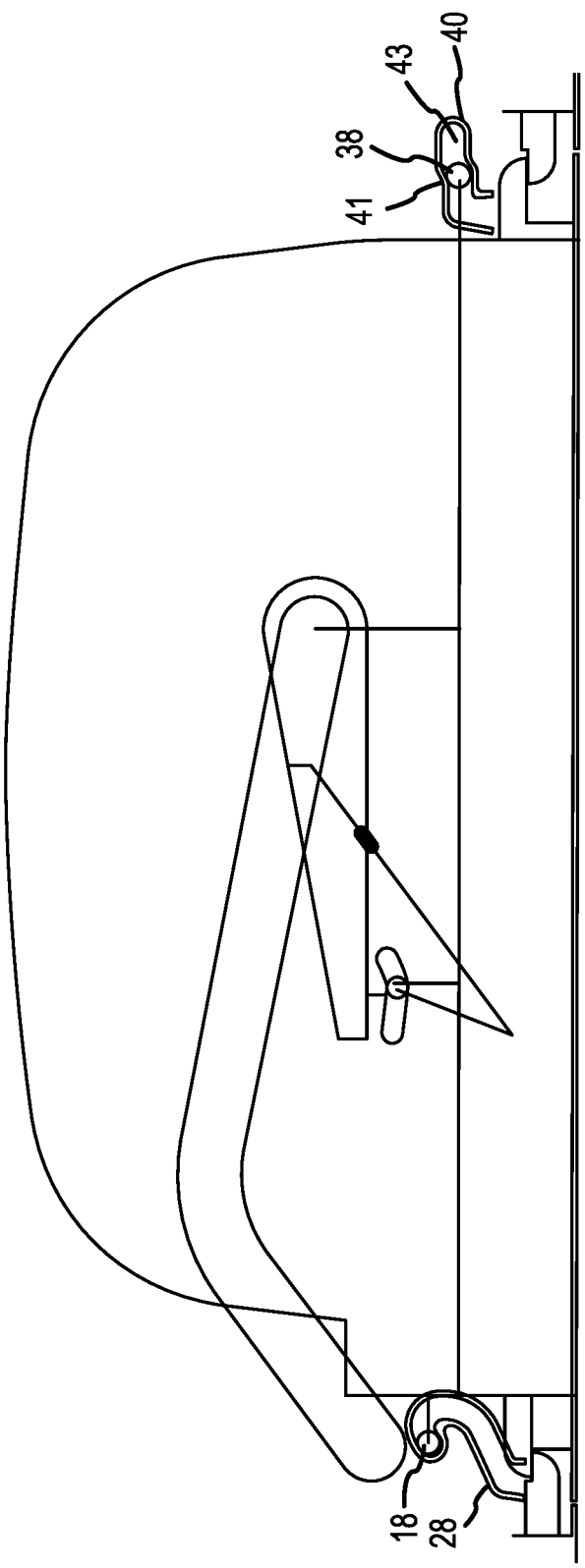
FIG. 11 is a schematic cross-section of another embodiment of the door assembly in the closed position.
Figure 12:
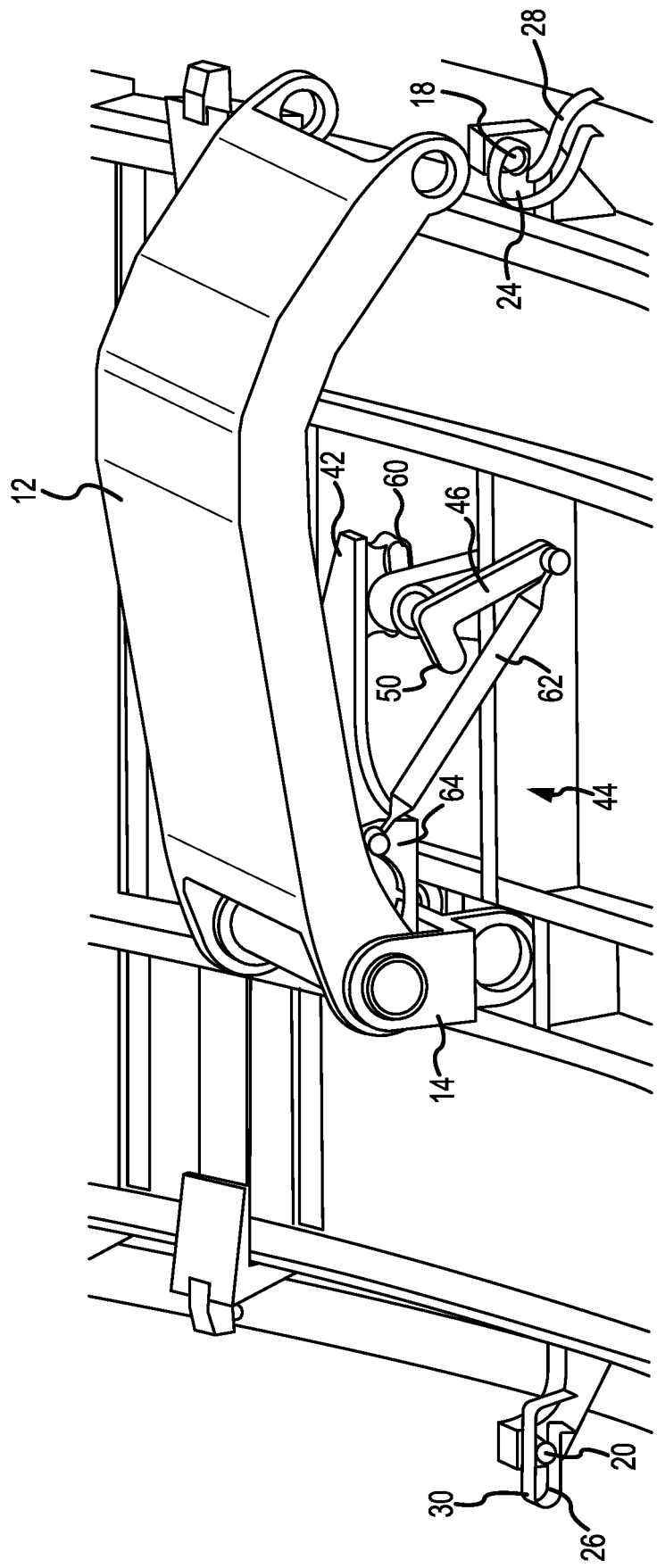
FIG. 12 is a perspective view of part of the door assembly of FIGS. 1 and 2 with the actuation mechanism in the closed position.
Figure 13:
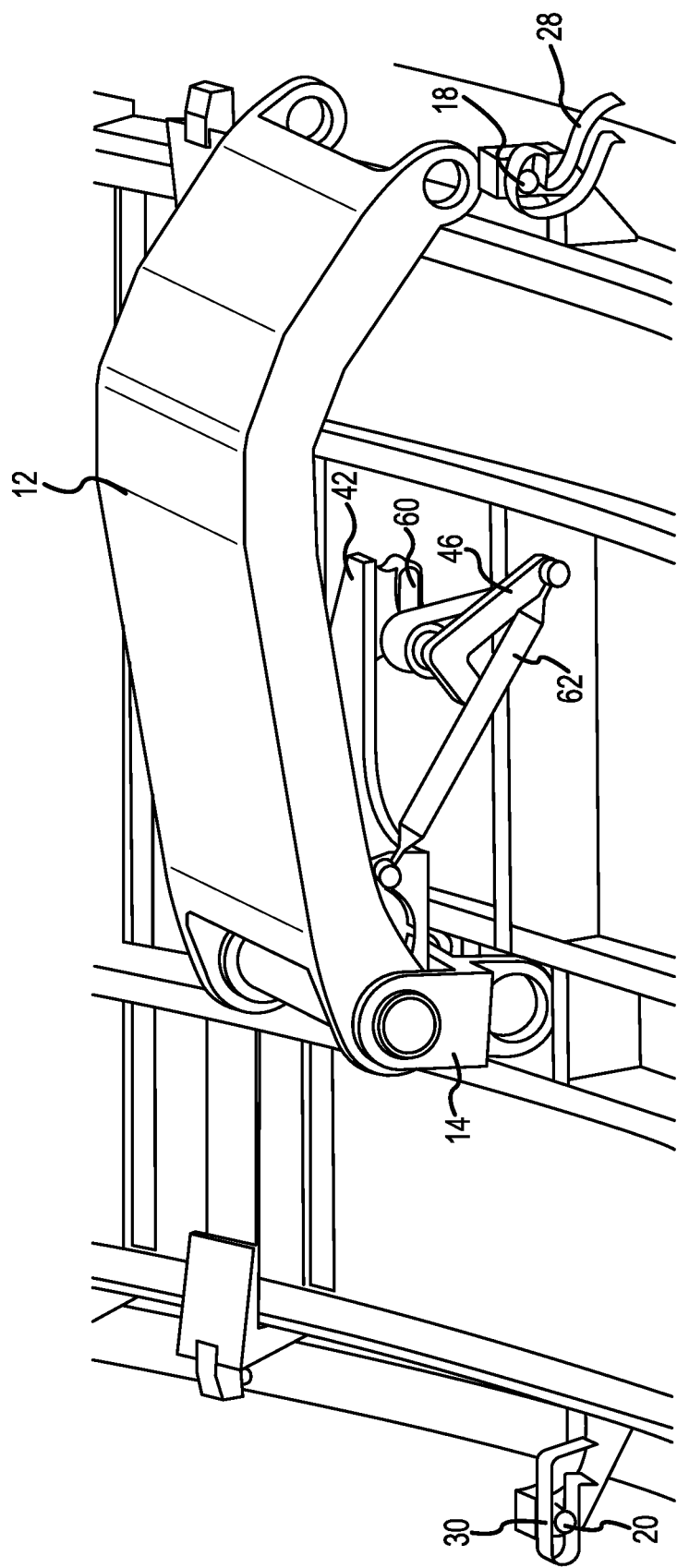
FIGS. 13 to 17 show the door assembly of FIG. 12 at various positions throughout a movement between the closed and disengaged positions.
Figure 14:
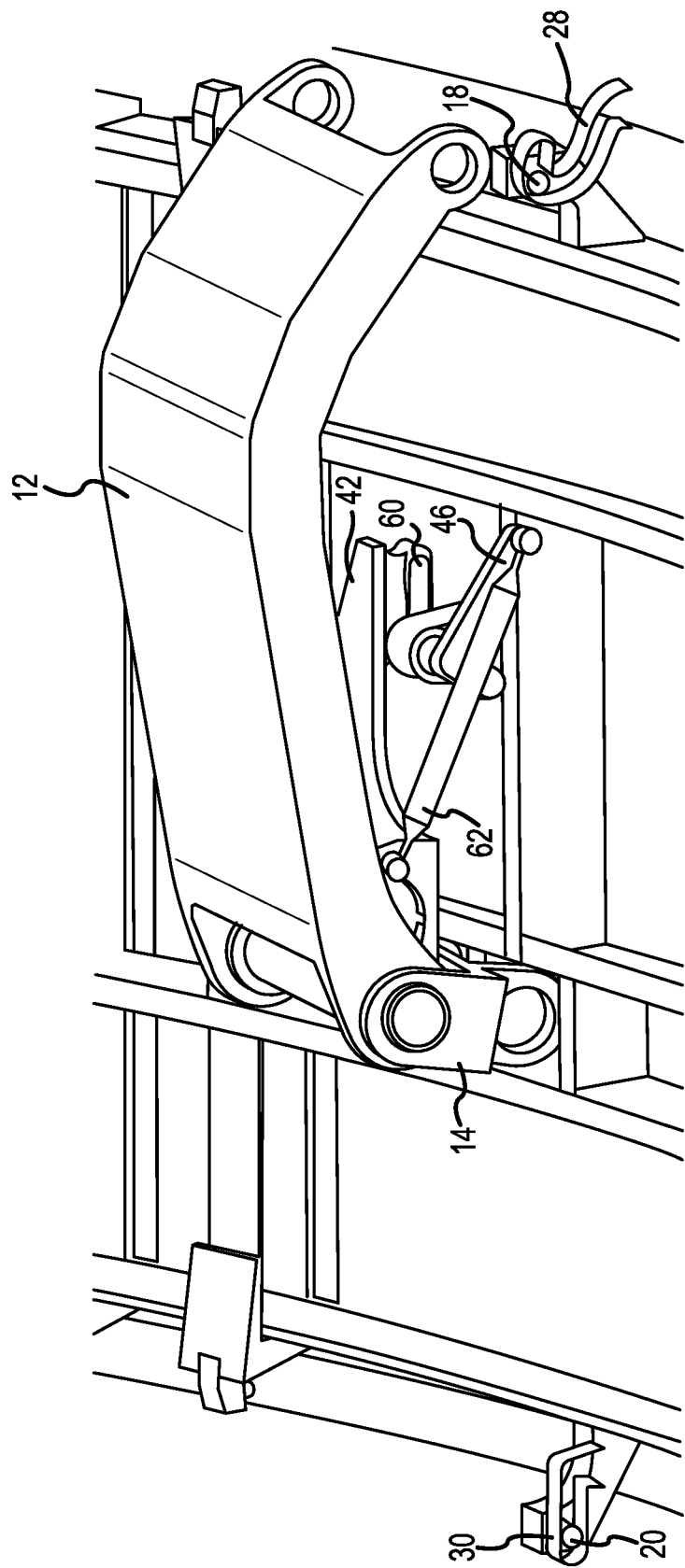
Figure 15:
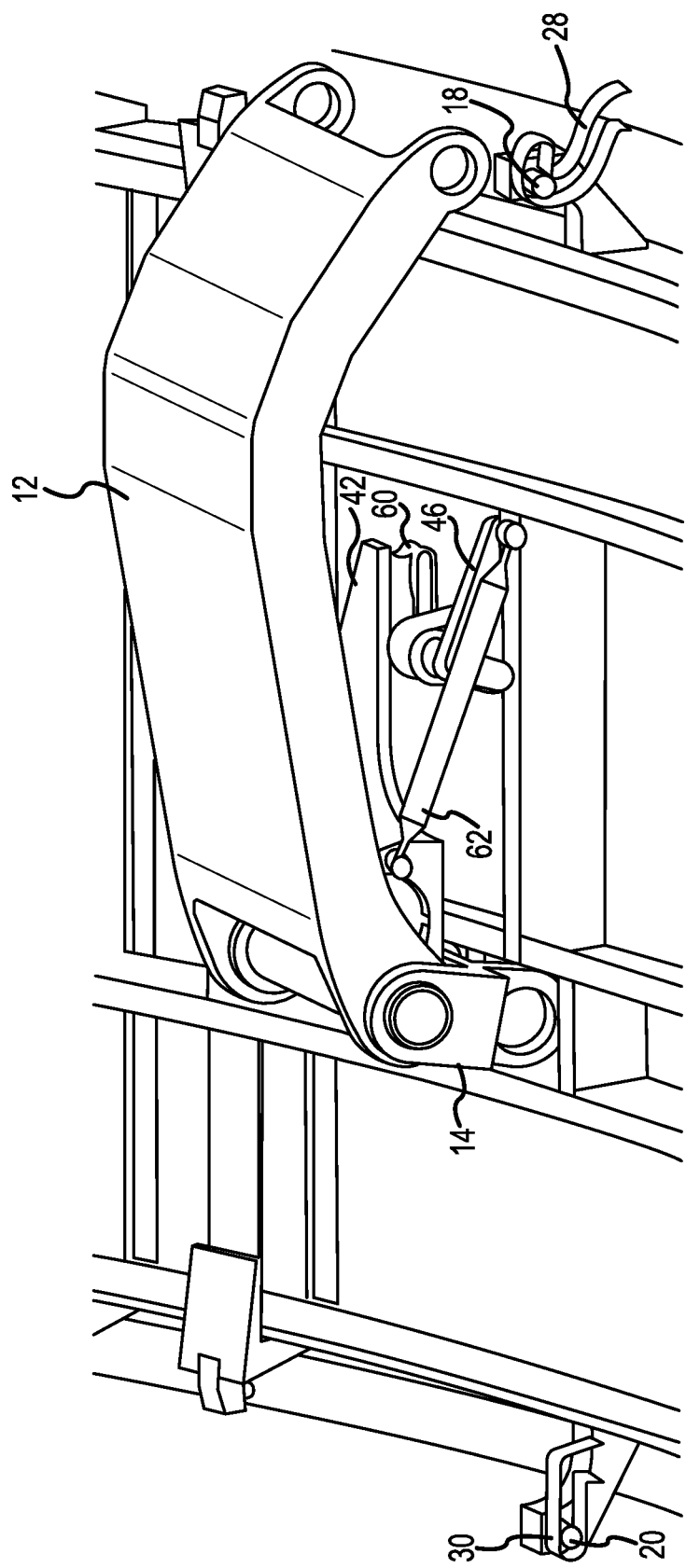
Figure 16:
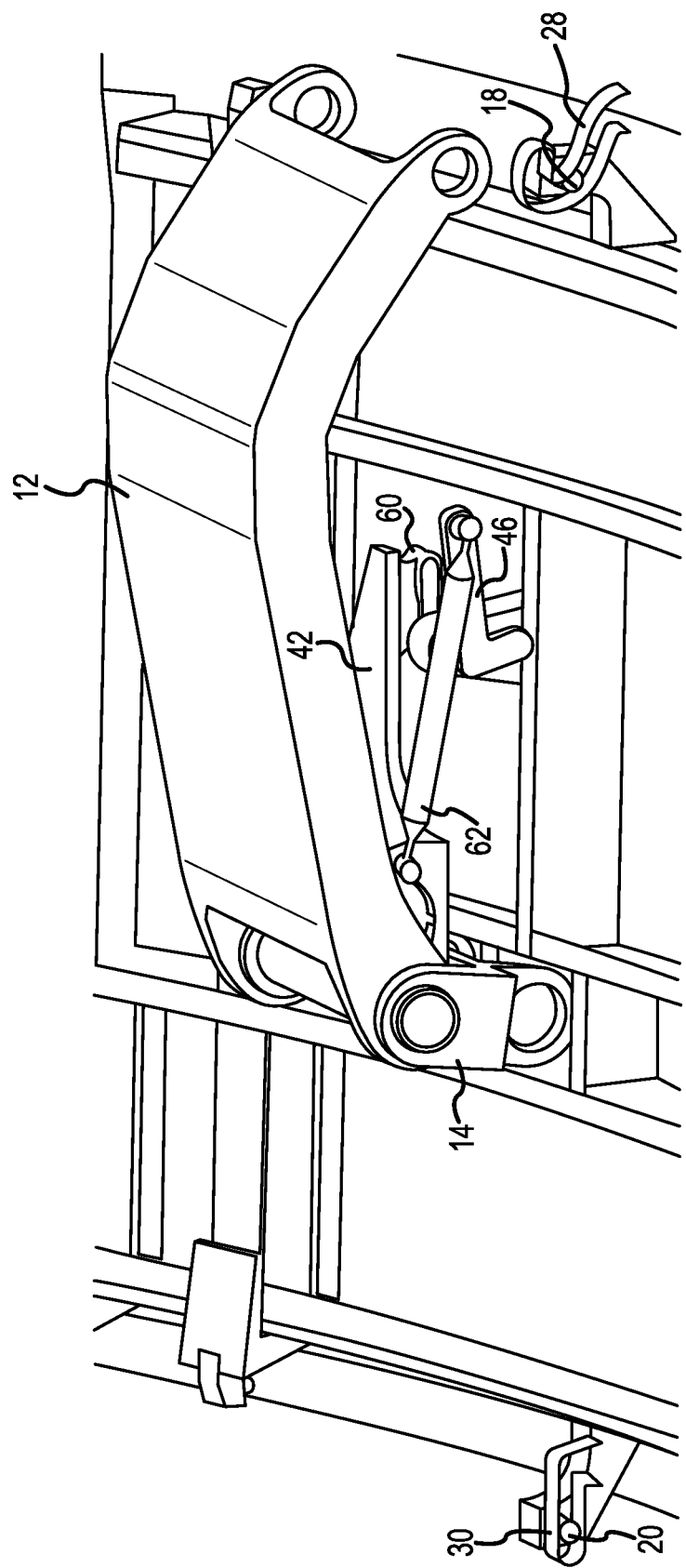
Figure 17:
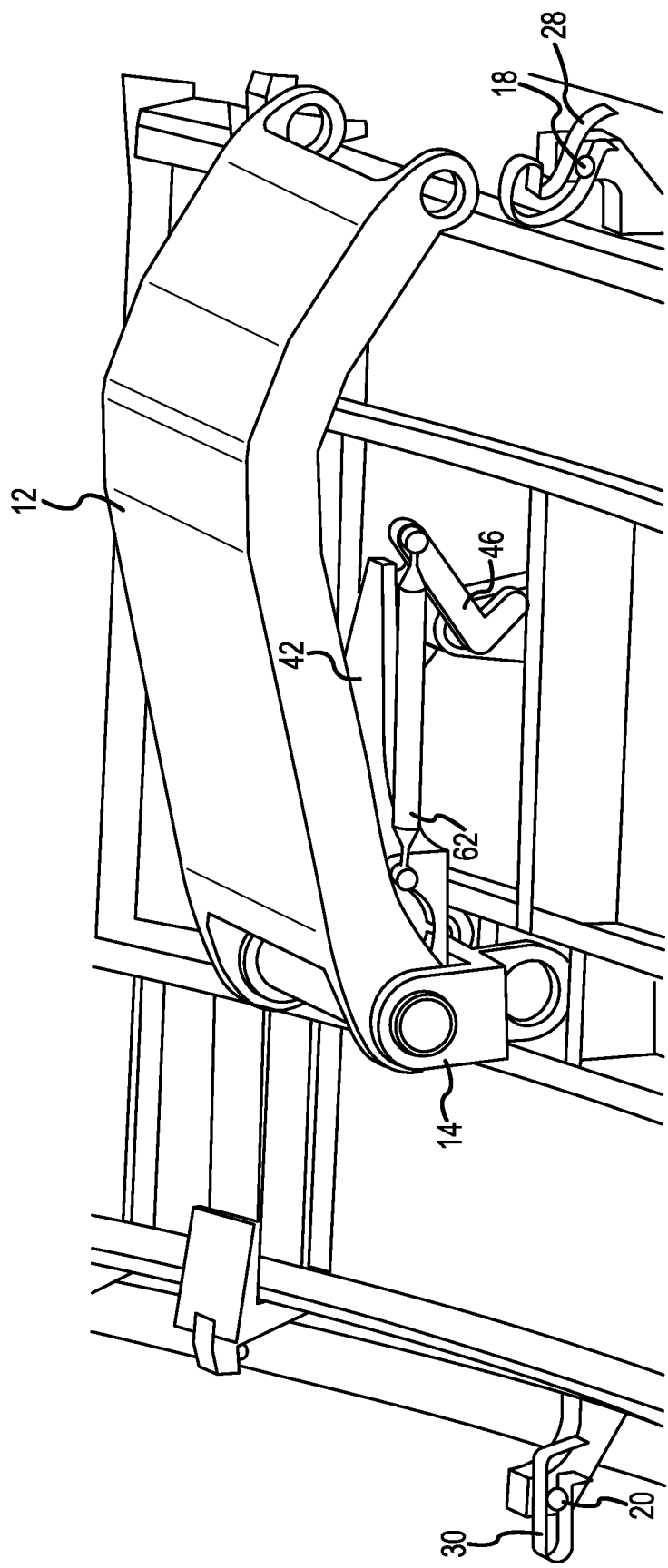

Once the rollers 18, 20 reach the forward ends of their channels 24, 26 and the shaft 48 reaches the forward end of the slot 60, the door 4 has reached the disengaged position shown in FIG. 10. The rollers 18, 20 may be removed from the guides via the openings in each channel 24, 26. Once the rollers 18, 20 have been disengaged, the door 4 is free to pivot open on the hinge arm 12.

While the disclosure has been described in connection with aircraft, the door mechanism disclosed could be used in other applications, particularly other applications involving a door enclosing a pressurised or depressurized compartment.

The invention claimed is:

1. A door assembly (2) for an aircraft, the door assembly (2) moveable between a closed position and a disengaged position and comprising:
    a door frame (6);
    a hinge arm (12) pivotally coupled at one end to a first side of the door frame (6); a door (4) receivable within the door frame (6);
    a support bracket (14) pivotally coupled at a first bracket end to a second end of the hinge arm (12) and at a second bracket end to the door (4) to support the door (4) on the hinge arm (12);
    the door frame (6) and the door (4) each comprising at least one stop (8, 10), the stops (8, 10) configured to engage with each other to retain the door (4) within the door frame (6) in the closed position of the door assembly (2);
    at least one pin (18, 20; 38) mounted on each side of the door (4);
    at least a first guide (28) coupled to the first side of the door frame (6) and at least a second guide (30) coupled to a second opposed side of the door frame (6), each guide (28, 30; 40) comprising a channel (24, 26; 43) receiving the at least one pin (18, 20; 38) to guide horizontal movement of the door (4) relative to the door frame (6);
    a link arm (42) pivotally coupled at one end to the support bracket (14) and the hinge arm (12) such that the link arm (42) maintains the same orientation with respect to the door frame (6) at all positions of the door (4) between the closed and disengaged positions; an actuation mechanism (44) coupled to the door (4) and to the link arm (42) for displacing the door (4) along a horizontal trajectory defined by the guides (28, 30; 40) and the at least one pin (18, 20; 38) to disengage the stops (8, 10) and release the door (4) from the door frame (6) to allow the door assembly (2) to be moved from the closed position to the disengaged position, wherein:
    the actuation mechanism (44) comprises a control lever (46) and a rod (62),
    the control lever (46) comprises a control lever shaft (48) pivotally mounted to the door (4) about a second axis (C) and to the link arm (42), and
    the control lever shaft (48) has a first portion (52) for pivotal mounting to the door (4) and a second portion (58) received in a slot (60) provided on the link arm (42), the second portion (58) being offset from the second axis (C).

2. The door assembly of claim 1, wherein the link arm (42), the support bracket (14) and the hinge arm (12) are pivotally coupled about a common axis (A) such that the link arm (42), the support bracket (14) and the hinge arm (12) are all rotatable with respect to each other about the common axis (A).

3. The door assembly of claim 2, wherein the link arm (42) comprises trunnions (43) on opposed sides of the link arm (42) along the common axis (A) about which the hinge arm (12) and the support bracket (14) are pivoted.

4. The door assembly of claim 1, wherein the rod (62) being pivotally coupled at one end to the control lever (46) and at a second rod end to the link arm (42) at a position intermediate the ends of the link arm (42), whereby rotation of the control lever (46) about the second axis (C) effects displacement of the door (4) along the horizontal trajectory.

5. The door assembly of claim 4, wherein the control lever (46) has a crank arm (50) for rotating the control lever (46) about the second axis (C) and for connection to an operating handle (66).

6. The door assembly of claim 1, wherein the slot (60) is curved to assist in displacing the door (4) along the horizontal trajectory.

7. The door assembly of claim 1, wherein the at least one pin (18, 20; 38) comprises a first pin (18), wherein at least a portion of the channel (24) of the first guide (28) is generally C-shaped such that, as the door (4) is displaced along the horizontal trajectory from the closed position, in a first phase of movement the first pin (18) received in the channel (24) of the first guide (28) moves along the channel (24) inwardly away from the door frame (6) and towards the second guide (30; 40), in a second phase of movement the first pin (18) moves outwardly towards the door frame (6), and in a third phase of movement the first pin (18) moves outwardly towards the door frame (6) and away from the second guide (30; 40).

8. The door assembly of claim 7, wherein the at least one pin (18, 20; 38) further comprises a second pin (20; 38), wherein at least a portion of the channel (26; 43) of the second guide (30; 40) is linear such that the second pin (20; 38) received in the channel (26; 43) of the second guide (30; 40) moves away from the first guide (28) in the first phase) of movement and towards the first guide (28) in the third phase of movement.

9. The door assembly of claim 8, wherein the at least one pin (18; 20; 38) comprises a second pin (38), wherein the channel (43) of the second guide (40) comprises a kink (41) such that the second pin (38) received in the channel (43) of the second guide (40) moves inwardly in the first phase of movement to move the door (4) inwardly away from the second side of the door frame (6).

10. The door assembly of claim 1, wherein the at least one pin (18; 20; 38) comprises a first pin (20), wherein the first pin (20) received in the channel (26) of the second guide (30) is eccentrically mounted to the door (4) such that initial rotation of the control lever (46) from the closed position causes movement of the door (4) inwardly away from the second side of the door frame (6).

11. The door assembly of claim 1, wherein the channel (24, 26; 43) of each guide (28, 30; 40) comprises an opening (76) to enable disengagement of the at least one pin (18, 20; 38) from the guide (28, 30; 40) to allow the door (4) to open once the door assembly (2) is in the disengaged position.

12. The door assembly of claim 1, wherein at least one of the pins (18, 20; 38) is a roller with a vertical axis of rotation.

13. An aircraft comprising the door assembly (2) of claim 1.

14. A method of opening a door (4) received within a door frame (6), the door (4) coupled to the door frame (6) by a hinge arm (12), the method comprising:
  guiding the door (4) along a horizontal trajectory by moving a first pin (18) and a second pin (38) mounted on the door (4) along respective guides (28, 30; 40) coupled to the door frame (6) to disengage the door (4) from the door frame (6), wherein:
    in a first phase of movement, the first pin (18) received in a channel (24) of a first guide (28) moves along the channel (24) inwardly away from the door frame (6) and towards a second guide (30; 40),
    the second pin (38) received in a channel (43) of the second guide (40) moves inwardly in the first phase of movement to move the door (4) inwardly away from the second side of the door frame (6);
    in a second phase of movement, the first pin (18) moves outwardly towards the door frame (6), and
    in a third phase of movement the first pin (18) moves outwardly towards the door frame (6) and away from the second guide (30; 40); and
  swinging the door (4) open on the hinge arm (12).

15. A door assembly (2) for an aircraft, the door assembly (2) moveable between a closed position and a disengaged position and comprising:
  a door frame (6);
  a hinge arm (12) pivotally coupled at one end to a first side of the door frame (6);
  a door (4) receivable within the door frame (6);
  a support bracket (14) pivotally coupled at one end to a second end of the hinge arm (12) and at a second bracket end to the door (4) to support the door (4) on the hinge arm (12);
  the door frame (6) and the door (4) each comprising at least one stop (8, 10), the stops (8, 10) configured to engage with each other to retain the door (4) within the door frame (6) in the closed position of the door assembly (2);
  a pin (18, 20; 38) mounted on each side of the door (4);
  at least a first guide (28) coupled to the first side of the door frame (6) and at least a second guide (30) coupled to a second opposed side of the door frame (6), each guide (28, 30; 40) comprising a channel (24, 26; 43) receiving a respective one of the pins (18, 20; 38) to guide horizontal movement of the door (4) relative to the door frame (6);
  a link arm (42) pivotally coupled at one end to the support bracket (14) and the hinge arm (12) such that the link arm (42) maintains the same orientation with respect to the door frame (6) at all positions of the door (4) between the closed and disengaged positions; and
  an actuation mechanism (44) coupled to the door (4) and to the link arm (42) for displacing the door (4) along a horizontal trajectory defined by the guides (28, 30; 40) and the pin (18, 20; 38) to disengage the stops (8, 10) and release the door (4) from the door frame (6) to allow the door assembly (2) to be moved from the closed position to the disengaged position, wherein:
    at least a portion of the channel (24) of the first guide (28) is generally C-shaped such that, as the door (4) is displaced along the horizontal trajectory from the closed position, in a first phase of movement the pin (18) received in the channel (24) of the first guide (28) moves along the channel (24) inwardly away from the door frame (6) and towards the second guide (30; 40), in a second phase of movement the pin (18) moves outwardly towards the door frame (6), and in a third phase of movement the pin (18) moves outwardly towards the door frame (6) and away from the second guide (30; 40)
    at least a portion of the channel (26; 43) of the second guide (30; 40) is linear such that the pin (20; 38) received in the channel (26; 43) of the second guide (30; 40) moves away from the first guide (28) in the first phase of movement and towards the first guide (28) in the third phase of movement,
    the channel (43) of the second guide (40) comprises a kink (41) such that the pin (38) received in the channel (43) of the second guide (40) moves inwardly in the first phase of movement to move the door (4) inwardly away from the second side of the door frame (6).

\* \* \* \* \*